United States Patent
Cociglio et al.

(10) Patent No.: US 8,451,734 B2
(45) Date of Patent: May 28, 2013

(54) MEASUREMENT OF DATA LOSS IN A COMMUNICATION NETWORK

(75) Inventors: Mauro Cociglio, Turin (IT); Luca Maria Castaldelli, Turin (IT); Domenico Laforgia, Turin (IT)

(73) Assignee: Telecom Italia S.p.A., Milan (IT)

( * ) Notice: Subject to any disclaimer, the term of this patent is extended or adjusted under 35 U.S.C. 154(b) by 163 days.

(21) Appl. No.: 13/141,531

(22) PCT Filed: Dec. 22, 2008

(86) PCT No.: PCT/EP2008/068189
§ 371 (c)(1),
(2), (4) Date: Jun. 22, 2011

(87) PCT Pub. No.: WO2010/072251
PCT Pub. Date: Jul. 1, 2010

(65) Prior Publication Data
US 2011/0255440 A1    Oct. 20, 2011

(51) Int. Cl.
*H04L 12/26* (2006.01)
(52) U.S. Cl.
USPC ..................... 370/235.1; 370/252
(58) Field of Classification Search
USPC ............. 370/231, 232, 235, 235.1, 252, 389, 370/391, 394, 474; 714/746–752
See application file for complete search history.

(56) References Cited

U.S. PATENT DOCUMENTS

| | | | |
|---|---|---|---|
| 5,335,222 A | 8/1994 | Kamoi et al. | |
| 6,188,674 B1 | 2/2001 | Chen et al. | |
| 7,983,183 B2 * | 7/2011 | Ostrup et al. | 370/252 |
| 8,270,309 B1 * | 9/2012 | Jones | 370/248 |
| 2003/0007785 A1 | 1/2003 | Shimizu | |
| 2005/0123003 A1 | 6/2005 | Bordonaro et al. | |
| 2007/0064611 A1 | 3/2007 | He | |

FOREIGN PATENT DOCUMENTS

| | | |
|---|---|---|
| EP | 1879349 A1 | 1/2008 |
| WO | 2006/102840 A1 | 10/2006 |

OTHER PUBLICATIONS

Written Opinion and International Search Report mailed Jun. 15, 2009, PCT/EP2008/068189.

* cited by examiner

*Primary Examiner* — Kwang B Yao
*Assistant Examiner* — Harun Chowdhury
(74) *Attorney, Agent, or Firm* — Banner & Witcoff, Ltd.

(57) ABSTRACT

A method for measuring data loss of a data flow in a communication network is provided. The method includes, at a transmitting node: marking each data unit of the data flow for dividing the data flow in blocks so that: data units of a same block have a feature with a same value, while data units of contiguous blocks have the feature with different values; increasing a first counter when the feature has the first value, and a second counter when the feature has the second value; and transmitting the data flow to a receiving node. The method includes, at the receiving node, for each data unit: checking the feature, increasing a third counter when the feature has the first value, and increasing a second counter when the feature has the second value. The method includes calculating data loss based on detected values of first, second, third and fourth counters.

15 Claims, 8 Drawing Sheets

MEASUREMENT OF DATA LOSS IN A COMMUNICATION NETWORK

CROSS REFERENCE TO RELATED APPLICATIONS:

This is a U.S. National Phase Application under 35 U.S.C. §371 of International Application No. PCT/EP2008/068189, filed Dec. 22, 2008, which was published Under PCT Article 21(2), the entire contents of which are incorporated herein by reference.

TECHNICAL FIELD

The present invention relates to the field of communication networks. In particular, the present invention relates to a method for measuring data loss in a communication network. Further, the present invention relates to a communication network implementing such a method.

BACKGROUND ART

It is known that, in a packet-switched communication network, data are transmitted in the form of packets that are routed from a source node to a destination node through possible intermediate nodes. Each packet typically has a header and a payload. The header generally includes information allowing routing of the packet, such as the source node address and the destination node address. On the other hand, the payload generally comprises a portion of the data to be transmitted from the source node to the destination node. Exemplary packet-switched networks are Local Area Networks (e.g. Ethernet) and Geographic Area Networks (e.g. Internet).

On the other hand, in circuit-switched networks data are transmitted in the form of continuous bit flows carried from the source node to the destination node within plesiochronous or synchronous frames. Exemplary circuit-switched networks are PDH, SDH, Sonet and OTN networks.

Data transmitted either in a packet-switched network or in a circuit-switched network from a source node not always reach the destination node, i.e. they may be lost during transmission through the network. Loss of data may be due to different reasons.

For instance, in a packet-switched network, data within a packet may be discarded by an intermediate node, since the port at which the packet is received or through which the packet has to be forwarded is congested. Indeed, each node is typically suitable for implementing a congestion management algorithm defining rules according to which the node should behave in case one of its ports becomes congested, e.g. due to a traffic peak. More particularly, such a congestion management algorithm typically defines a criterion for selecting the packets to be discarded and the packets to be processed. Such a criterion may be based e.g. on the order according to which the packets arrive at the congested port, their priorities, and so on.

Besides, both in packet-switched networks and in circuit-switched networks, data may be discarded by an intermediate node or by the destination node, since they contain bit errors. Indeed, as it is known, a digital signal transmitted from a first node on a link to a second node may comprise bit errors, i.e. the received digital signal may be different from the transmitted digital signal since a certain number of its bits have wrong values. The parameters of the first node, the second node and the link are typically tailored for achieving a bit error rate lower than a target value, such as e.g. $10^{-9}$ (i.e. 1 bit has the wrong value every 1.000.000.000 bits). Data comprising bit errors, if detected, are typically discarded.

For some types of traffic, for which neither the order according to which data are received at the destination node nor the delay between data transmission and data reception is relevant (e.g. non-real time traffic), a mechanism providing re-transmission of discarded data may be implemented. However, for other types of traffic requiring data to be received in a predefined order and with reduced delay, re-transmission of discarded data can not be implemented.

When providing a service by transmitting data through a packet-switched network or a circuit-switched network, the rate of data lost during transmission affects the quality of service (QoS) of that service.

EP 1 879 349 discloses a method of measuring loss of packets in a communications network, comprising the steps of: generating a plurality of packets, each packet having a routing header. The packets are configured to follow a round-trip path in the network. The packets are then sent by a network node and at least a number of the packets are subsequently received at the network node, whereupon the quantity of the at least the number of the packets is evaluated. Together with knowledge of the quantity of packets sent, the quantity of packets received is used to determine a packet loss metric.

U.S. Pat. No. 6,188,674 discloses a method for packet loss measurement by identifying traffic flows in the ingress side of switches, and measuring packets losses for the identifies flows on the egress side of the switches. Specifically, on the ingress side of the switch, the last packet of each fixed size incoming packet block is marked to make it distinct from other packets in the block. On the egress side, the packet flow is monitored and the packets are counted using the block size as a counting modulo. The value of this counter at the receipt of a marked packets is used to update the number of packets that do not make their way across the switch.

WO 2006/102840 discloses a method for monitoring the packet loss rate in the label switched network, including: the message statistics information is carried in the OAM frame for monitoring the packet loss rate and transmitted from the source node of LSP to the destination node; after the destination node receives the OAM frame, it calculates the current packet loss rate based on the message statistics information.

SUMMARY OF THE INVENTION

The Applicant has noticed that the above known solutions for measuring the rate of lost data (in particular, the number of lost packets in a packet-switched communication network) have some drawbacks.

As to the solution of EP 1 879 349, it may applied only to an artificial flow of packets following a round-trip path, since the difference between transmitted packets and received packets is computed at a same node. Therefore, disadvantageously, such a method can not be applied to real packet flows providing services, since these real packet flows typically do not follow a round-trip path, but they usually are transmitted from the service provider to users. Therefore, disadvantageously, the solution of EP 1 879 349 may be suitable for performing laboratory tests, but it is unsuitable for measuring packet loss in a packet-switched network supporting transmission of real packet flows.

As to the solution of U.S. Pat. No. 6,188,674, it disadvantageously requires a very large amount of computation resources, since at the transmission side each packet must be numbered, while at the reception side the number of each packet must be read, and the numbers of the received packets have to be processed for determining whether a packet is missing from the original sequence of packets. Moreover, using the block size as a counting modulo does not allow to uniquely determine the number of lost packets. Indeed, by assuming e.g. that the counting modulo is 10, the solution of U.S. Pat. No. 6,188,674 disadvantageously is not able to distinguish between the situations in which x, x+10, x+20, x+30, etc. (x between 1 and 9) packets are lost.

As to the solution of WO 2006/102840, it disadvantageously requires buffers for delaying transmission of packets each time an OAM frame has to be inserted in the packet flow. Moreover, this solution is particularly vulnerable to loss of OAM frames, since all the statistics information allowing to calculate the packet loss rate are concentrated in such frames.

Accordingly, the Applicant has tackled the problem of providing a method for measuring data loss in a communication network, which overcomes the aforesaid drawbacks.

In particular, the Applicant has tackled the problem of providing a method for measuring data loss in a communication network which does not require a large amount of computation resources, which can be applied to any real data flow independently of its path within the network, and which does not require implementation of buffers or other devices making transmission and reception apparatuses of the nodes more complex.

In the following description and in the claims, the expression "measuring data loss" will designate an operation of measuring a difference between a number of data units (i.e. packets, portions of packets, plesiochronous frames, portions of plesiochronous frames, synchronous frames, portions of synchronous frames) transmitted by a transmitting node and a number of data units (i.e. packets, portions of packets, plesiochronous frames, portions of plesiochronous frames, synchronous frames, portions of synchronous frames) received by a receiving node, this difference corresponding to the number of data units lost in transmission from the transmitting node to the receiving node.

The transmitting node and the receiving node may be either physically adjacent nodes (i.e. they are connected by a physical link such as e.g. an optical fiber), or they may be connected through intermediate nodes.

Besides, in the following description and in the claims, the expression "marking a data unit" will designate an operation of setting a feature of the data unit to a value suitable for distinguishing the data unit from other data units of the same data flow. For instance, the operation of marking a data unit may comprise the operation of setting one or more bits of the data unit (e.g. one bit or a bit sequence of its header) to a predefined value, the operation of setting its frequency or its phase to a predefined value, and so on.

According to a first aspect, the present invention provides a method for measuring data loss of a data flow transmitted through a communication network, the method comprising:
a) at a transmitting node, marking each data unit of the data flow by setting a feature of the data unit to one of a first value and a second value for dividing the data flow in blocks so that data units belonging to a same block have the feature with a same value, and data units belonging to contiguous blocks have the feature with different values;
b) at the transmitting node, increasing a first counter when the feature is set to the first value, and increasing a second counter when the feature is set to the second value;
c) transmitting the data flow to a receiving node;
d) at the receiving node, for each data unit of the data flow checking the feature, increasing a third counter when the feature is equal to the first value, and increasing a fourth counter when the feature is equal to the second value; and
e) calculating a data loss value based on detected values of the first counter, the second counter, the third counter and the fourth counter.

Preferably, step a) comprises marking each data unit of the data flow by setting at least one bit of the data unit to one of a first value and a second value.

Preferably, step a) comprises marking each data unit of the data flow by setting at least two bits of the data unit to suitable values for distinguishing the data units from further data units processed by the transmitting node and belonging to traffic flows other than the traffic flow.

Profitably, step a) comprises marking the data units for dividing the data flow in blocks all having a same number of data units.

Preferably, step a) comprises marking the data units for dividing the data flow in blocks all having a time duration equal to a block period.

Profitably, step e) comprises periodically detecting values of the first counter, the second counter, the third counter and the fourth counter every detection period, and step a) comprises setting a block period equal to at least twice the value of the detection period, so that during step e), the values of the first counter, the second counter, the third counter and the fourth counter are detected at least twice.

Preferably, step e) comprises, at each detection period:
e1) if the value of the first counter detected at the detection period is equal to the value of the first counter detected at a previous detection period and is different from the value of the first counter detected at a further previous detection period, and the value of the second counter detected at the detection period is different from the value of the second counter detected at the previous detection period:
 calculating the data loss value as a difference between the value of the first counter detected at the detection period and the value of the third counter detected at the detection period; and
e2) if the value of the first counter detected at the detection period is different from the value of the first counter detected at a previous detection period and the value of the second counter detected at the detection period is equal to the value of the second counter detected at a previous detection period and is different from the value of the second counter detected at a further previous detection period:
 calculating the data loss value as a difference between the value of the second counter detected at the detection period and the value of the fourth counter detected at the detection period.

Preferably, the data flow is a point-to-multipoint transmission among a transmitting node and a plurality of receiving nodes, and step e) is performed detecting once the value of the first counter and second counter at the transmitting node.

Profitably, the data unit is a data packet and the communication network is a packet-switched communication network, the method being for measuring packet loss of a packet flow transmitted through the packet-switched communication network.

According to a second aspect, the present invention provides a communication network comprising a transmitting node, a receiving node and a management server suitable for cooperating with the communication network,
wherein the transmitting node is configured to:
a) mark each data unit of the data flow by setting a feature of the data unit to one of a first value and a second value for dividing the data flow in blocks so that data units belonging to a same block have the feature with a same value, and data units belonging to contiguous blocks have the feature with different values;
b) increase a first counter when the feature is set to the first value, and increase a second counter when the feature is set to the second value; and
c) transmit the data flow to a receiving node,
wherein the receiving node is configured to:
d) for each data unit of the data flow check the feature, increase a third counter when the feature is equal to the first value, and increase a second counter when the feature is equal to the second value; and
wherein the management server is configured to:
e) calculate a data loss value based on detected values of the first counter, the second counter, the third counter and the fourth counter.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Herein after, a preferred embodiment of the method will be described in detail by referring to the particular exemplary case of measuring data loss in a packet-switched network by measuring the number of packets (i.e. the data unit is a packet) lost in transmission from a transmitting node to a receiving node.

Figure 1:
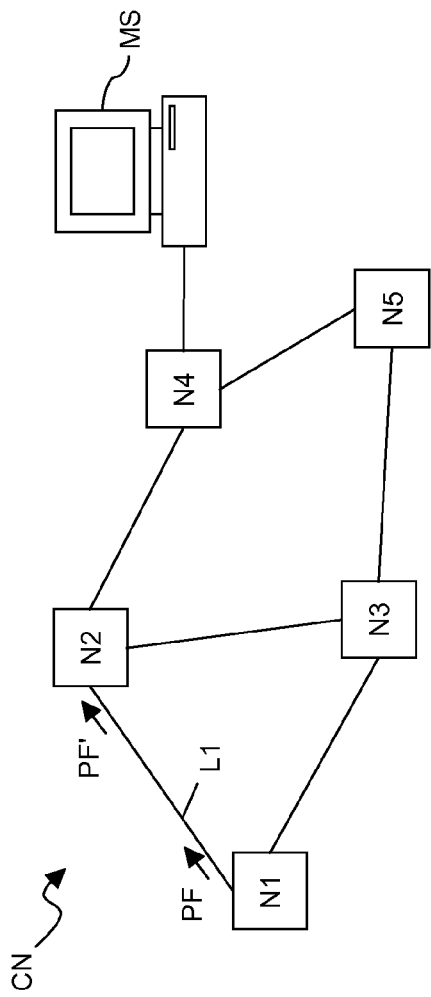
FIG. 1 schematically shows an exemplary packet-switched network.

FIG. 1 schematically shows an exemplary packet-switched communication network CN comprising five nodes N1, N2, ... N5 connected each other according to a partially meshed topology. In particular, the nodes N1 and N2 are adjacent nodes connected by the link L1. The number of nodes and the topology of the communication network CN are merely exemplary. The communication network CN may be for instance an Ethernet network, an Internet network, or any other type of packet-switched communication network.

The communication network CN is suitable for cooperating with a management server MS. In FIG. 1, the management server MS is connected to the node N4. This is merely exemplary, since the management server MS may be connected to the communication network CN through any of its nodes N1, N2, ..., N5. Alternatively, the management server MS may be integrated in any of the nodes N1, N2, ..., N5 of the communication network CN. The role of the management server MS will be described in detail herein after.

The nodes N1, N2, ..., N5 of the communication network CN exchange traffic in the form of packet flows. By way of example, herein after only the packet flow PF transmitted from the node N1 (herein after termed "transmitting node") to the node N2 (herein after termed "receiving node") through the link L1 will be considered. The transmitting node N1 may be either the source node of the packet flow PF or an intermediate node of the path from the source node to the destination node. Similarly, the receiving node N2 may be either the destination node of the packet flow PF or an intermediate node of the path from the source node to the destination node.

Figure 2:
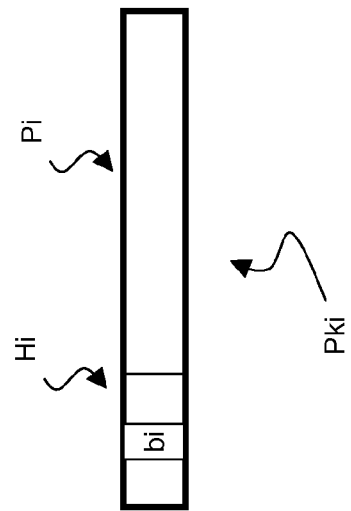
FIG. 2 schematically shows a packet's structure, according to an embodiment of the present invention.

The packet flow PF comprises a plurality of packets Pki. As shown in FIG. 2, each packet Pki has a header Hi and a payload Pi. As mentioned above, the payload Pi comprises a portion of the traffic to be transmitted from the source node to the destination node. Besides, preferably, the header Hi comprises information for routing the packet Pi, such as the source node address (i.e. the address of the transmitting node N1, if it is the source node) and the destination node address (i.e. the address of the receiving node N2, if it is the destination node). According to embodiments of the present invention, the header Hi of each packet Pi further comprises a bit bi. Preferably, the bit bi is used by the transmitting node N1 for marking the packet Pki, thus allowing the receiving node N2 to perform measurement of the data loss relating to the packet flow PF, as it will be described in detail herein after.

According to embodiments of the present invention, before transmitting the packets Pki of the packet flow PF to the receiving node N2 along the link L1, the transmitting node N1 preferably marks the packets Pki for dividing the packet flow PF in blocks, each block comprising a number of packets. The blocks may be all of a same length (i.e. they may all comprise a same number of packets Pki), or they may have different lengths.

The transmitting node N1 preferably uses the bit bi of the header Hi of each packet Pki for marking the packets Pki. In particular, since the bit bi may assume only two values (1 and 0), the transmitting node N1 marks the packets Pki by setting the value of the bit bi of the various packets Pki according to the following rules:
i. packets Pki included in a same block have the bit bi with a same value; and
ii. packets Pki included in contiguous blocks have the bit bi with different values.

The bit bi may be for instance a bit to which the protocol according to which the packet Pki is formatted has not assigned a specific function yet. Alternatively, the bit bi may be a bit of a field having other uses, such as for instance a bit of the priority field in IP packets, or a bit of the label field in MPLS packets.

Therefore, for instance, assuming that N is the number of packets Pki for all the blocks, the transmitting node N1 may form a first block by setting the bit bi of N consecutive packets Pki equal to 1, then form a second block by setting the bit bi of the N successive packets Pki equal to 0, then form a third block by setting the bit bi of the N successive packets Pki equal to 1, then form a fourth block by setting the bit bi of the N successive packets Pki equal to 0, and so on.

The packet flow PF is then divided in a sequence of blocks, wherein blocks including packets Pki marked by the bit bi equal to 1 alternate with blocks including packets Pki marked by the bit bi equal to 0.

According to a particularly preferred embodiment, the transmitting node N1 marks the various packets Pki, not according to the number of packets Pki to be included in each block, but according to a timer, as it will be described herein after by referring to the flow chart of FIG. 3.

Figure 3:
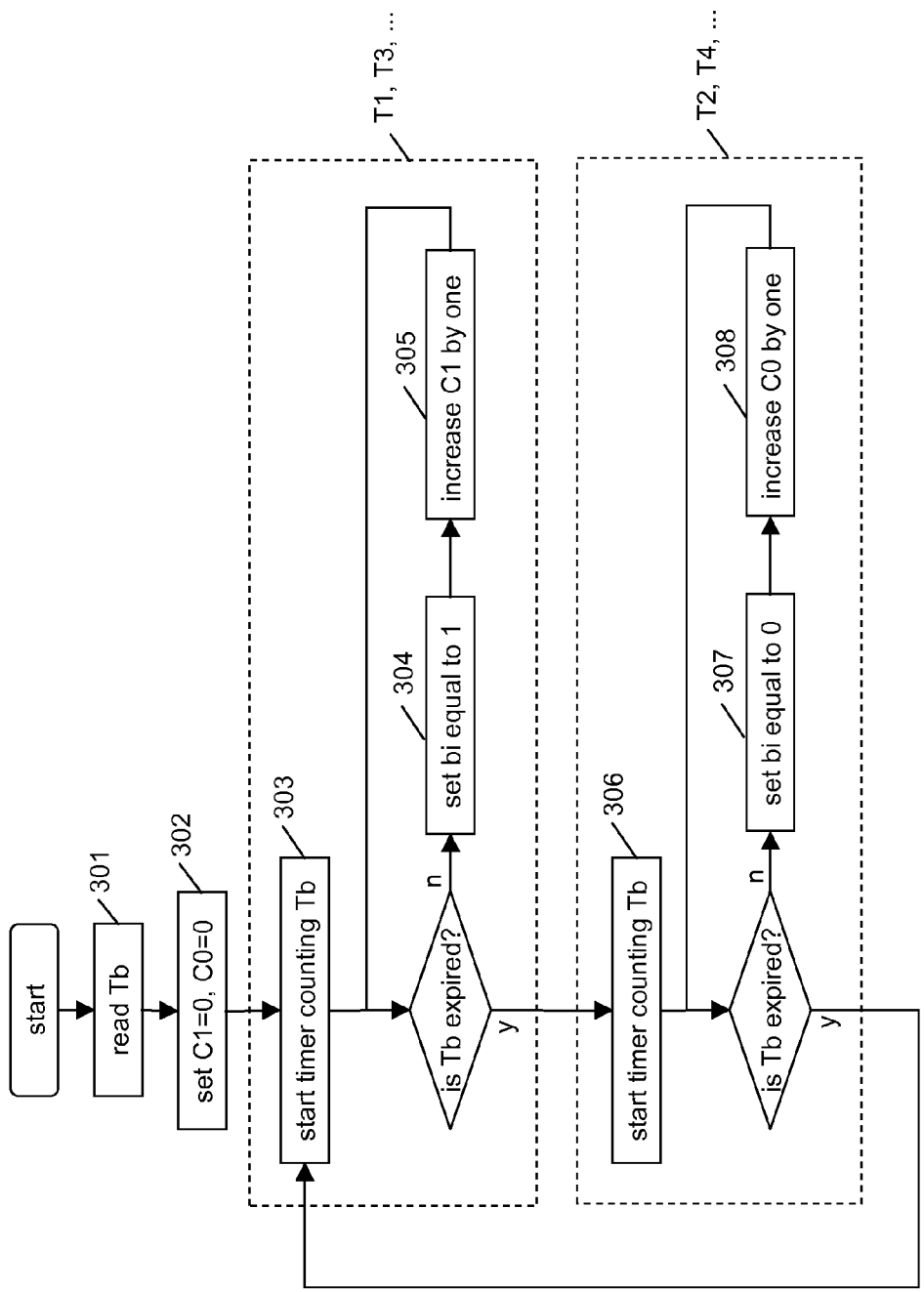
FIG. 3 is a flow chart of the operation of the transmitting node.

With reference to FIG. 3, when the transmitting node N1 determines that a data loss measurement relative to the packet flow PF has to be started, it preferably sets a block period Tb (step 301). During step 301, the block period Tb may be automatically set by the transmitting node N1 according to predefined criteria, such as the speed of the port through which the packet flow PF is transmitted, the hour of the day, and the available resources at the transmitting node N1. Alternatively, the block period Tb may be automatically set by the management server MS and transmitted to the transmitting node N1 in a management message (e.g. a management message commanding the transmitting node N1 to start the operations allowing measurement of the data loss). Alternatively, the block period Tb may be manually input at the management server MS by an operator responsible of managing the communication network CN, e.g. by means of a graphic user interface (not shown in FIG. 1) of the management server MS.

Then, preferably, the transmitting node N1 initialises a first counter C1 and a second counter C0 at the value 0 (step 302).

Figure 4:
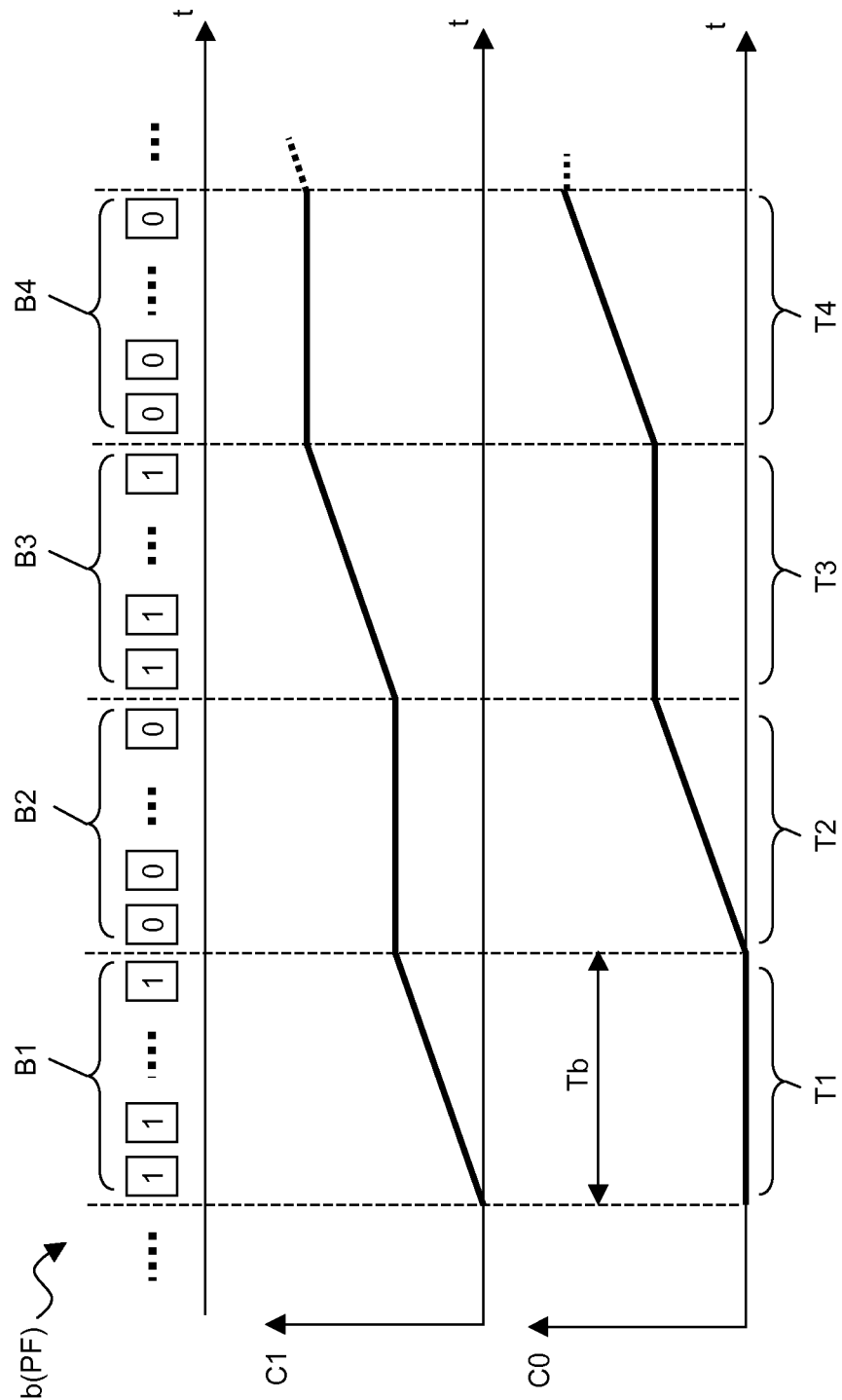
FIG. 4 shows three time diagrams relating to the operation of the transmitting node.

Then, preferably, the transmitting node N1 starts a timer expiring after a block period Tb (step 303), thus starting a first block period T1 (see also FIG. 4).

While the timer is not expired (i.e. during the first block period T1), each time the transmitting node N1 has to transmit a packet Pki of the packet flow PF, it marks it by setting its bit bi to a first value, namely 1 (step 304). Besides, each time the transmitting node N1 sets the bit bi of a packet Pki equal to 1, it increases by one the value of the first counter C1 (step 305).

Therefore, during the first block period T1, all the packets Pki transmitted by the transmitting node N1 form a first block B1 (shown in FIG. 4) and are marked by their bit bi set to 1 (in FIG. 4, the reference "b(PF)" indicates the values of the bit bi for the packets Pki of the packet flow PF). Besides, as also shown in FIG. 4, during the first block period T1 the value of the first counter C1 increases, and at the end of the first block period T1 is equal to the number of packets Pki forming the first block B1. Besides, as also shown in FIG. 4, during the first block period T1 the second counter C0 remains equal to 0.

When the timer expires, the transmitting node N1 preferably restarts it (step 306), thus starting a second block period T2 (see also FIG. 3).

While the timer is not expired (i.e. during the second block period T2), each time the transmitting node N1 has to transmit a packet Pki of the packet flow PF, it marks it by setting its bit bi to a second value, namely 0 (step 307). Besides, each time the transmitting node N1 sets the bit bi of a packet Pki equal to 0, it increases by one the value of the second counter C0 (step 308).

Therefore, during the second block period T2, all the packets Pki transmitted by the transmitting node N1 form a second block B2 (shown in FIG. 4) and are marked with their bit bi set to 0 (as shown in FIG. 4). Besides, as also shown in FIG. 4, during the second block period T2 the value of the second counter C0 increases, and at the end of the second block period T2 is equal to the number of packets Pki forming the second block B2. Besides, as also shown in FIG. 4, during the second block period T2 the first counter C1 remains equal to the value reached at the end of the first block period T1.

Then, the transmitting node N1 preferably repeats the above described steps 303, 304 and 305 thereby forming, during a third block period T3, a third block B3 comprising packets Pki having their bits bi set to 1. Besides, as also shown in FIG. 3, during the third block period T3 the value of the first counter C1 further increases, and at the end of the third block period T3 is equal to the overall number of packets Pki forming the first block B1 and the third block B3. Besides, as also shown in FIG. 4, during the third block period T3 the second counter C0 remains equal to the value reached at the end of the second block period T2.

Then, the transmitting node N1 preferably repeats the above described steps 306, 307 and 308 thereby forming, during a fourth block period T4, a fourth block B4 comprising packets Pki having their bits bi set to 0. Besides, as also shown in FIG. 4, during the fourth block period T4 the value of the second counter C0 further increases, and at the end of the fourth block period T4 is equal to the overall number of packets Pki forming the second block B2 and the fourth block B4. Besides, as also shown in FIG. 4, during the fourth block period T4 the first counter C1 remains equal to the value reached at the end of the third block period T3.

Preferably, the transmitting node N1 cyclically repeats steps 303, 304 and 305 (thereby generating further blocks Bk, k being equal to 5, 7, 9, etc.) and steps 306, 307 and 308 (thereby generating further blocks Bk+1). Such blocks are not shown in FIG. 4 for simplicity.

It has to be noticed that packets formed according to the above described flow chart of FIG. 3 within a same data loss measurement session have all substantially a same duration, but they may include different numbers of packets Pki. Indeed, the number of packets Pki forming a given block depends on the number of packets actually transmitted by the transmitting node Nb during the block period corresponding to the block. For instance, during low-traffic hours, the blocks comprise a lower number of packets that during high-traffic hours.

Advantageously, the above disclosed operation of the transmitting node N1 is very simple. Indeed, the first transmitting node N1 does not have to behave according complex logics for numbering the packets or inserting additional packets in the packet flow PF. On the contrary, the transmitting node N1 simply has to mark each packet Pki to be transmitted by setting the value of the bit bi at an appropriate value, that is 1 or 0, depending on the block period counted by the timer.

Figure 5:
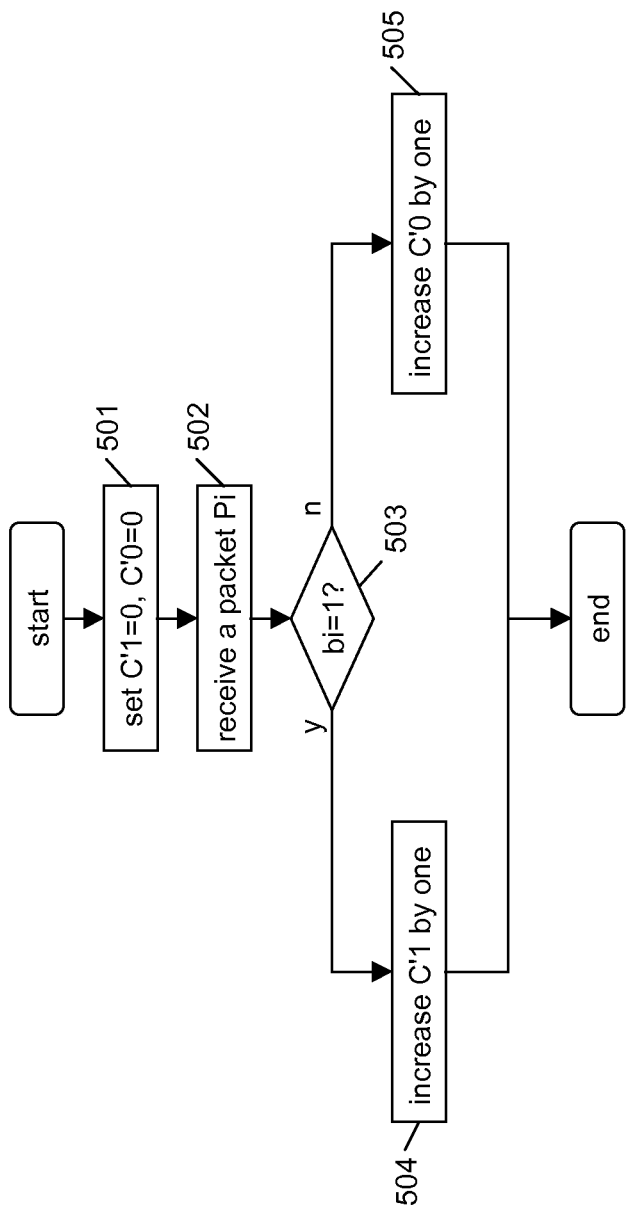
FIG. 5 is a flow chart of the operation of the receiving node.
Figure 6:
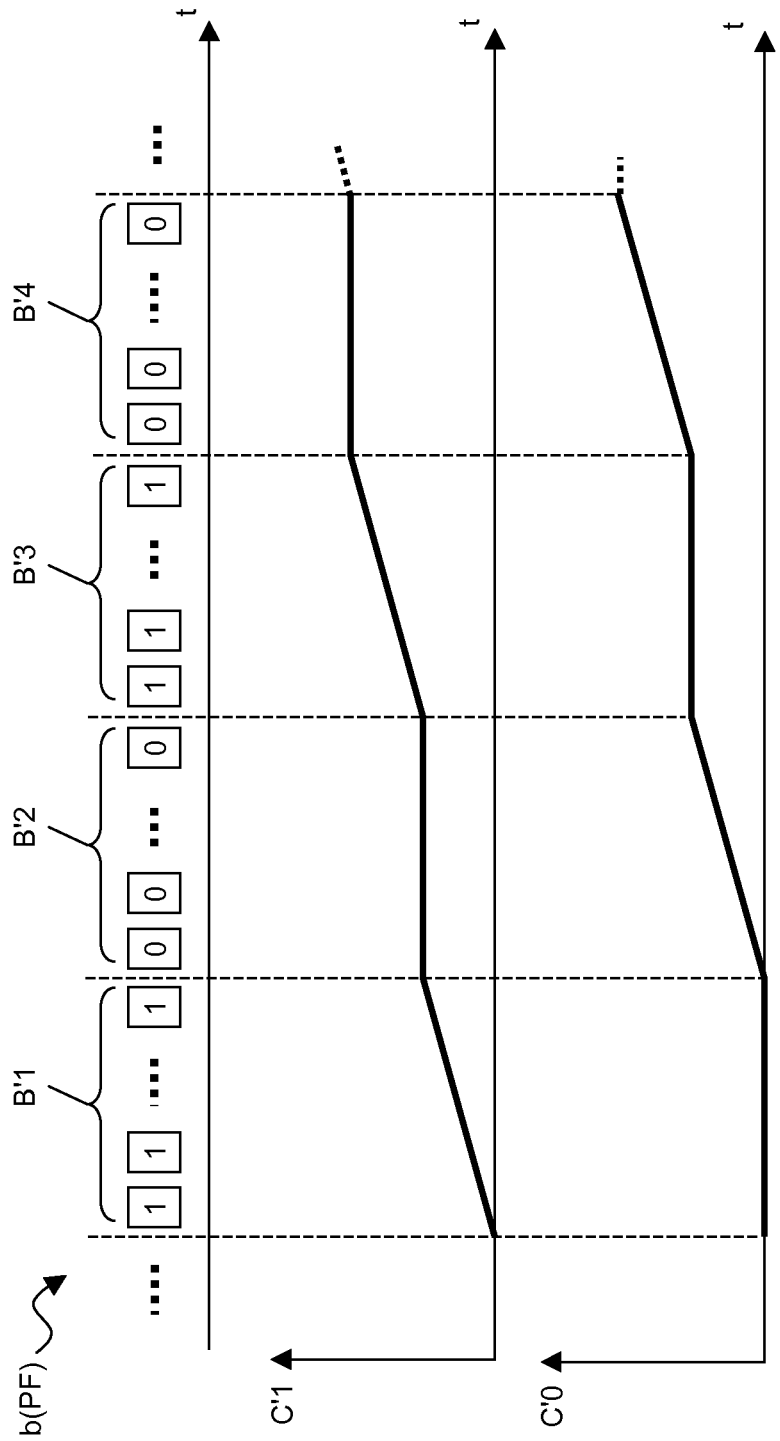
FIG. 6 shows three time diagrams relating to the operation of the receiving node.

By referring now to FIGS. 5 and 6, the packet flow PF divided in blocks B1, B2, B3, B4, . . . is transmitted to the receiving node N2, that receives a further packet flow PF' divided in corresponding further blocks B1', B2', B3', B4'. Each further block B1', B2', B3', B4', . . . differs from the corresponding block B1, B2, B3, B4, . . . in that one or more packets Pki originally comprised in the block have been lost during transmission on the link L1.

Before starting receiving the further blocks B1', B2', B3', B4', the receiving node N2 preferably initialises a third counter C'1 and a fourth counter C'0 at the value 0 (step 501). Step 501 may be triggered e.g. by management message transmitted from the management server MS and commanding the receiving node N2 to start the operations allowing measurement of the data loss for the packet flow PF.

Then, the receiving node N2 listens for possible packets Pki received from the transmitting node N1 on the link L1. Each time a packet Pki is received (step 502), the receiving node N2 preferably checks its marking, i.e. it checks the value of its bit bi (step 503). If the bit bi is equal to 1, the receiving node N2 preferably increases by one the third counter C'1 (step 504). Otherwise, the receiving node N2 preferably increases by one the fourth counter C'0 (step 505).

Therefore, as shown in FIG. 6, while the receiving node N2 is receiving packets Pki of the blocks B'1, B'3, . . . corresponding to the blocks B1, B3, . . . of FIG. 4, the third counter C'1 is increased, while the fourth counter C'0 is fixed. On the other hand, while the receiving node N2 is receiving packets Pki of the blocks B2', B'4, . . . corresponding to the blocks B2, B4, . . . of FIG. 4, the fourth counter C'0 is increased, while the third counter C'1 is fixed.

Advantageously, also the operation of the receiving node N2 is very simple, since it only has to check the marking, i.e. the value of the bit bi, of the received packets Pki and, according to the value, increase by one the corresponding counter. This operation advantageously does not require a large amount of resources, and is also very fast.

Therefore, while the packet flow PF is being transmitted from the transmitting node N1 to the receiving node N2, the transmitting node N1 sets the bits bi for forming the above blocks and correspondingly increases the counters C1 and C0, while the receiving block N2 reads the bits bi and correspondingly increases the counters C'1 and C'0.

According to embodiments of the present invention, the management server MS periodically detects the values of the counters C1 and C0 at the transmitting node N1 and the values of the counters C'1 and C'0 at the receiver node N2, and uses these values for measuring the data loss relative to the packet flow PF.

Figure 7:
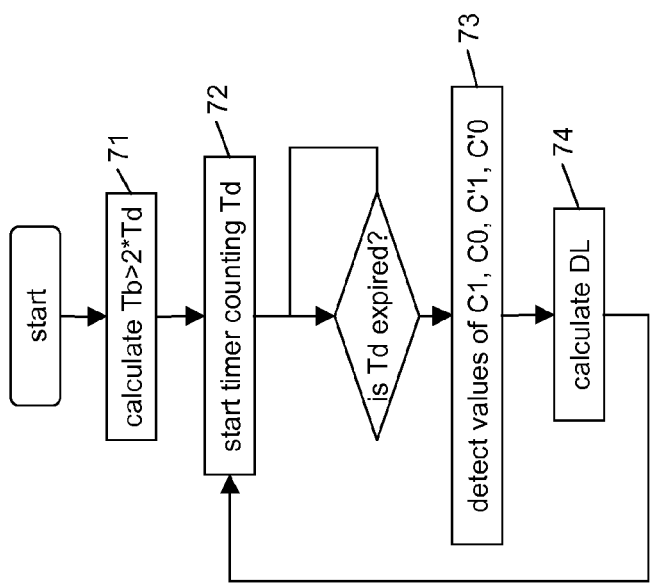
FIG. 7 is a flow chart of a first operation performed by the management server.

In particular, by referring FIG. 7, the management server MS preferably sets a detection period Td (step 71), i.e. a period for cyclically detecting the values of the counters C1, C0, C'1 and C'0. The criteria to set the detection period Td may be a time limit depending on the implementation of sampling and processing mechanisms, or could be a specific desired detection period Td higher than such time limit. Preferably, during step 71 the block period Tb is calculated so that, in every block period Tb, the values of the counters C1, C0, C'1 and C'0 are detected at least twice. This advantageously allows the management server MS to determine, for each block period, which counter is increasing and which one has a fixed value.

For instance, the block period Tb may be calculated according to the following formula:

$$Tb > 2*Td, \quad [1]$$

For instance, in case the detection period Td is 1 minute, equation [1] results in a block period Tb of more than 2 minutes, preferably at least 3 or more minutes. Preferably, the block period Tb is calculated according to the following formula:

$$Tb >= 3*Tb, \quad [2]$$

For instance, in case the detection period Td is 1 minute, equation [2] results in a block period Tb higher than or equal to 3 minutes.

After setting the detection period Td, the management server MS preferably starts a timer counting the detection period Td (step 72) and, each time the timer expires, detects the values of the first counter C1 and the second counter C0 at the transmitting node N1, and detects the values of the third counter C'1 and the fourth counter C'0 at the receiving node N2 (step 73). Preferably, the management server MS performs step 703 by transmitting to the transmitting node N1 a suitable management message requesting the current values of the counters C1 and C0, and by transmitting to the receiving node N2 a suitable management message requesting the current values of the counters C'1 and C'0.

Then, after detecting the values of the counters C1, C0, C'1 and C'0, the management server MS preferably uses such values for calculating the data loss DL (step 74).

Figure 9:
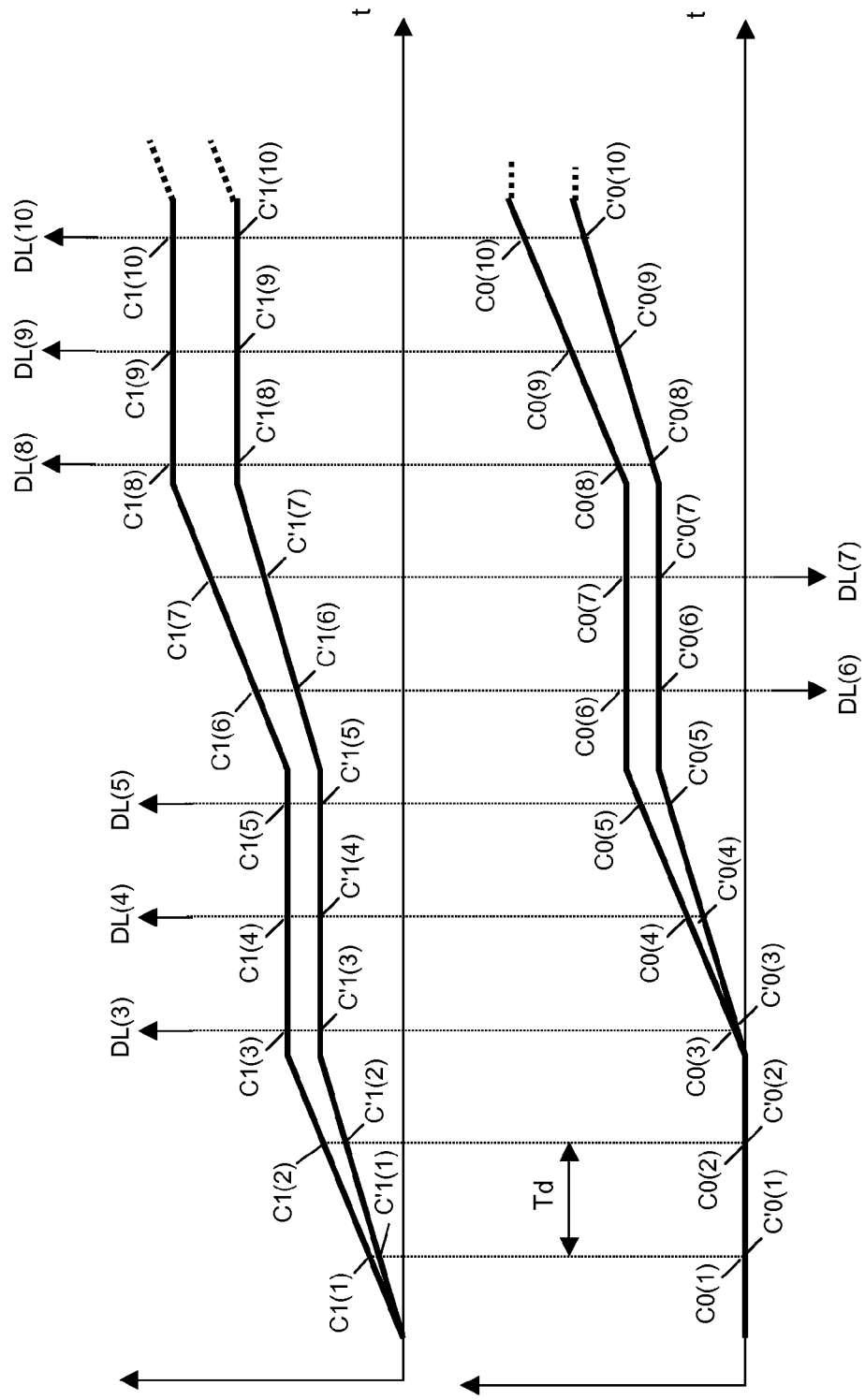
FIG. 9 shows two time diagrams relating to the operation of the management server.

Steps 73 and 74 are periodically repeated at every detection period Td. Therefore, as shown in FIG. 9, at a given detection period Td (e.g. the k-th detection period) the management server MS detects values $C1(k)$, $C0(k)$, $C'1(k)$, $C'0(k)$, k being an integer index corresponding to the detection period. For simplicity, FIG. 9 only shows the first 10 detected values $C1(k)$, $C0(k)$, $C'1(k)$, $C'0(k)$, k=1, . . . 10.

Herein after, by referring to FIG. 8, step 74 of calculating the data loss DL will be described in detail, by referring to a generic k-th detection period.

After step 73, the management system MS preferably compares the values $C1(k)$ and $C0(k)$ detected during the current detection period (i.e. the k-th detection period) with the values $C1(k-1)$ and $C0(k-1)$, respectively, detected during a previous detection period and with the values $C1(k-2)$ and $C0(k-2)$, respectively, detected during a further previous detection period (sub-step 741).

Then, the management system MS preferably determines whether the value $C1(k)$ is equal to the value $C1(k-1)$ and different from the value $C1(k-2)$ and whether the value $C0(k)$ is equal to the value $C0(k-1)$ and different from the value $C0(k-2)$ (sub-step 742).

Firstly, it is assumed that the value $C1(k)$ is equal to the value $C1(k-1)$, while the value of $C0(k)$ is different from the value $C0(k-1)$. By referring to FIG. 9, this condition is fulfilled e.g. for k=3, 4, 5 and for k=8, 9, 10.

In this situation, the management server MS realizes that the currently detected values $C1(k)$ and $C0(k)$ refer to a block period Tb wherein the first counter C1 has a fixed value, while the second counter C0 is increasing (see e.g. the second block period T2 and the fourth block period T4 of FIG. 4), since the currently transmitted packets Pki are marked by their bit bi equal to 0. The management server MS then calculates the data loss $DL(k)$ as the difference between the currently detected value $C1(k)$ of the first counter and the currently detected value $C'1(k)$ of the third counter (sub-step 743). The difference $C1(k)-C'1(k)$ is substantially equal to the overall number of packets Pki marked by their bit bi equal to 1, that have been lost in transmission of the packet flow PF since the measurement of the data loss has been started (i.e. since transmission of the first block B1 during the first block period T1 shown in FIG. 4).

It has to be noticed that, although the values of $DL(k)$ according to sub-step 743 are calculated at a block period during which packets Pki with their bit bi at the value 0 are transmitted (i.e. the second block period T2 and the fourth block period T4), they refer to the previous block period, i.e. to a block period during which packets Pki marked by their bit bi equal to 1 are transmitted. For instance, the data losses $DL(3)$, $DL(4)$ and $DL(5)$, that are calculated during the second block period T2, refer to loss of packets during transmission of the first block B1, i.e. during the first block period T1. Similarly, the data losses $DL(8)$, $DL(9)$ and $DL(10)$, that are calculated during the fourth block period T4, refer to loss of packets during transmission of the third block B3, i.e. during the third block period T3.

It is now assumed that the value $C1(k)$ is different from the value $C1(k-1)$, while the value of $C0(k)$ is equal to the value $C0(k-1)$. By referring to FIG. 9, this condition is fulfilled e.g. for k=6, 7 (also for k=1, 2, 3, but the first block period B1 is not taken into account, since transmission of packets Pki with their bit bi at the value 0 has not been started yet, therefore it is unnecessary measuring the data loss).

In this situation, the management server MS realizes that the currently detected values $C1(k)$ and $C0(k)$ refer to a block period Tb wherein the second counter C0 has a fixed value, while the first counter C1 is increasing (see e.g. the third block period T3 of FIG. 4), since the currently transmitted packets Pki are marked by their bit bi equal to 1. The management server MS then calculates the data loss $DL(k)$ as the difference between the currently detected value C0(k) of the second counter C0 and the currently detected value C'0(k) of the fourth counter C'0 (sub-step 744). The difference C0(k)−C'0(k) is substantially equal to the overall number of packets Pki marked by their bit bi equal to 0, that have been lost in transmission of the packet flow PF since the measurement of the data loss has been started (i.e. since transmission of the first block B1 during the first block period T1 shown in FIG. 4).

It has to be noticed that, although the values of DL(k) according to sub-step 744 are calculated at a block period during which packets Pki with their bit bi at the value 1 are transmitted (i.e. the third block period T3 of FIG. 4), they refer to the previous block period, i.e. to a block period during which packets Pki marked by their bit bi equal to 0 are transmitted. For instance, the data losses DL(6) and dL(7), that are calculated during the third block period T3, refer to loss of packets during transmission of the second block B2, i.e. during the second block period T2.

Once the values DL(k) of the data loss have been calculated for each detection period Td, they can be processed e.g. for determining the number of packets Pki lost during each block period Tb. For instance, the difference between DL(8), DL(9) or DL(10) and DL(3), DL(4) or DL(5) indicates the number of packets Pki that have been lost during the second block period T2. More generally, the number of packets Pki that have been lost during the n-th block period can be obtained as the difference between any of the values of data loss DL(k) calculated during the (n+1)-th block period and any of the values of data loss DL(k) calculated during the (n−1)-th block period.

The number of packets Pki lost during a single block period may then be divided by the number of packets Pki transmitted in that block period (which may be derived by the values of the first counter C1 and the second counter C0), thereby providing a packet loss ratio (i.e. the ratio between number of lost packets and number of transmitted packets).

It can be noticed that, advantageously, the final values of data loss DL(k) are actually independent of the number of packets Pki included in each block. This is due to the fact that they are calculated as a difference between packets transmitted in a block and packets received in a corresponding block.

This has a number of advantages.

First of all, it allows to implement the step of forming the blocks with the above described timer counting the block period Tb. This is much simpler than forming blocks with a fixed size. Indeed, forming blocks with fixed size would require counting the number of packets that has already been inserted in a block for deciding the value of the bit bi of the next packet Pki to be transmitted. On the other hand, forming blocks according to a timer merely requires implementing the timer and changing the value of the bit bi of the packets Pki to be transmitted each time the timer expires. This mechanism is very simple and inexpensive, and can be implemented also on high speed ports without the need of using any buffer or complex logics.

Moreover, the time accuracy required by the operation of forming the blocks by suitably marking the packets Pki at the transmitting node is quite low. Indeed, even if the timer counting the block period Tb has a relative high tolerance, or even if there is a delay between timer expiration and change of value of the bit bi, the accuracy of the final result (i.e. the data loss values DL(k)) is not affected. Indeed, possible oscillations of the block period merely affect the number of packets included in the blocks. The number of packets Pki included in each block however is not fixed, and it does not affect the resulting values of data loss DL(k), as explained above.

Moreover, the method is advantageously simple to implement also at the management server MS. Indeed, the management server MS merely has to detect the values of the counters C1, C0, C'1 and C'0 (and to perform very simple operations, such as differences of integer numbers) at least twice for each block period Tb. However, since the block period Tb may be of a few minutes (e.g. 5 minutes), such an operation requires a small amount of computation resources, since it has to be iterated with a quite long period (2 minutes, in case the block period is 5 minutes).

Moreover, advantageously, no synchronization is required between transmitting node N1, receiving node N2 and management server MS. Indeed, the receiving node N2 ignores the block period Tb used at the transmitting node, and merely increases the counters C'1 and C'0 in an asynchronous way, according to the values of the bit bi of the received packets Pki. As to the management server MS, it merely uses the block period for calculating the detection period in order to ensure that the values of the counters are detected twice for every block period. After calculating the detection period, the detection of the counter values requires no synchronization with the transmitting node N1, but simply operates according to the timer implemented at the management server and counting the detection period Td.

Figure 8:
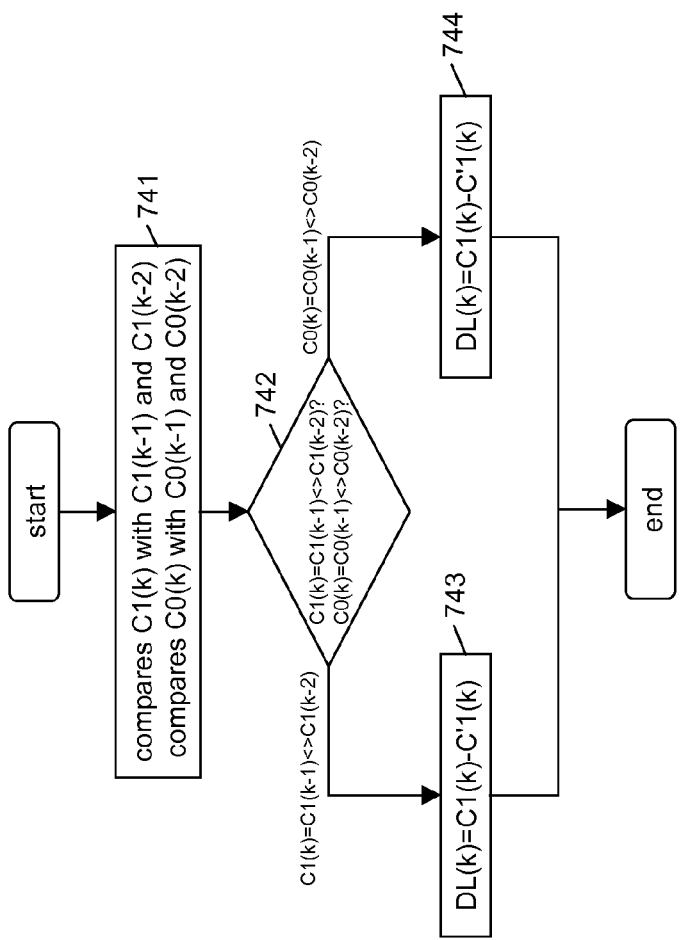
FIG. 8 is a flow chart of a second operation performed by the management server.

This advantageously allows implementing the operations shown in FIGS. 7 and 8 at any server cooperating with the communication network CN, such as for instance the server responsible of performing management operations (alarm monitoring, performance monitoring, network nodes configuration, and so on) upon the network nodes of the communication network CN.

Although the method has been described in detail only for measuring data loss of a packet flow PF between two physically adjacent nodes (i.e. the transmitting node N1 and the receiving node N2), according to embodiments not shown in the drawings, it can be used for measuring data loss of a packet flow between two non-physically adjacent nodes. In particular, it can be used for measuring the data loss relative to an end-to-end packet flow transmitted from a given source node to a given destination node. In this case, the source node preferably identifies the packets belonging to the end-to-end packet flow (e.g. by using their source address and their destination address) and applies the above steps shown in FIG. 3 only to the identified packets. On the other hand, also the destination node identifies the packets belonging to the end-to-end packet flow, and applies the above steps shown in FIG. 5 only to the identified packets. In this way, the source and destination node may provide to the management server MS the counters C1, C0, C'1 and C'0, that the management server MS may use for calculating an end-to-end data loss.

The above method may be applied both in case of point-to-point transmission, and in case of point-to-multipoint, or multicast, transmission. In this latter case, a separate measurement of data loss can be performed for each destination node of the point-to-multipoint transmission.

According to further embodiments, the above disclosed method is applied to an end-to-end packet flow for measuring the end-to-end data loss and also the amount of data lost on each intermediate hop. To this purpose, each intermediate node receiving packets to be forwarded to the destination node acts both as a receiving node and as a transmitting node. In particular, the intermediate node applies the above steps shown in FIG. 5 to packets received from an upstream node, while it applies the above steps shown in FIG. 3 to the same packets before forwarding them to a downstream node. In this way, the source node generates a first couple of counters C1, C0, the first intermediate node generates a second couple of counter C'1, C'0 and a third couple of counters C"1, C"0, the second intermediate node generates a fourth couple of counters C'''1, C'''0 and a fifth couple of counters C''''1, C''''0 and so on. The management server MS preferably periodically detects the value of all these counters, and processes them for calculating the data loss on each hop. For instance, the first couple of counters C1, C0 and the second couple of counters C'1, C'0 are used for calculating the data loss on the first hop between the source node and the first intermediate node; the third couple of counters C"1, C"0 and the fourth couple of counters C'''1, C''' are used for calculating the data loss on the second hop between the first intermediate node and the second intermediate node; and so on. The combination of the data loss results on each hop allows the management server MS to calculate the end-to-end data loss relative to the packet flow.

According to further embodiments not shown in the drawings, in addition to the bit bi, at least another bit of each packet Pki is reserved for marking the packets Pki. For instance, a further bit in the header of each packet Pki may be used for marking the packet Pki as follows: when this further bit is set to 0, it indicates that this packet Pki belongs to a packet flow currently not under measurement, while when this further bit is equal to 1, it indicates that the packet Pki belongs to a packet flow currently under measurement. This advantageously allows to distinguish packets of a packet flow to be measured from other packet flows not to be measured without the need of reading any other information in the packet header (such as for instance the source node address or the destination node address, as mentioned above). According to still further embodiments not shown in the drawings, a number of bits of the header of each packet Pki may be used for marking the packets so as to indicate different packet flows to be measured. For instance, 2 bits of the header would allow identifying three different packets flows, while 3 bits would allow identifying seven different packet flows.

The bit bi (and possible further bits for identifying the packets flows to be measured) may be provided into the header of packets to be transmitted by suitably modifying the protocols according to which the packets are formatted. For instance, if the packets Pki are formatted according to the MPLS (Multi Protocol Label Switching), the label field of the MPLS header may include the bit bi and may also be used for identifying different packet flows to be measured.

Figure 10:
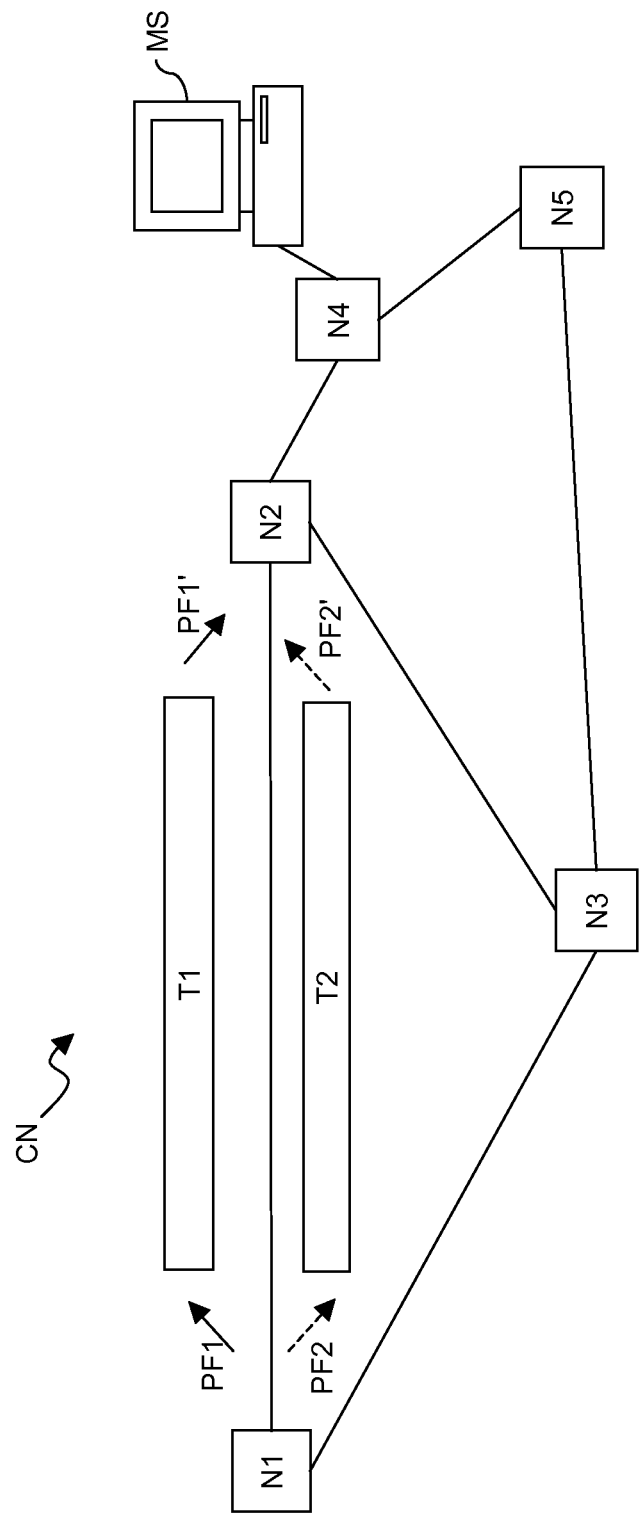
FIG. 10 shows an application of the method of the invention to the communication network of FIG. 1.

In particular, FIG. 10 schematically shows an application of the communication network CN of FIG. 1 in case packets are formatted according to the MPLS.

In this situation, the label field of the packet headers is used for alternately transmitting the packets Pki from the transmitting node N1 to the receiving node N2 through a first tunnel T1 (for a block period Tb) and a second tunnel T2 (for a block period Tb). Therefore, a first packet flow PF1 is transmitted through the first tunnel T1, and a second packet flow PF2 is transmitted through the second tunnel T2.

For measuring data loss on the link between N1 and N2, data loss is separately measured on the first tunnel T1 and on the second tunnel T2. In particular, the number of packets entering and exiting each tunnel is measured, substantially with a same detection period Td, according to the procedure described above.

If a number of packet flows has to be transmitted from the transmitting node N1 to the receiving node N2, each packet flow is assigned to a respective pair of tunnels. For each packet flow, the measurement of data loss is performed as described above.

The invention claimed is:

1. A method for measuring data loss of a data flow transmitted through a communication network, said method comprising:
    a) at a transmitting node, marking each data unit of said data flow by setting a feature of said data unit to one of a first value or a second value for dividing said data flow in blocks so that data units belonging to a same block have said feature with a same value, and data units belonging to contiguous blocks have said feature with different values;
    b) at said transmitting node, transmitting said data flow to a receiving node, said transmitting comprising increasing a first counter when a data unit having said feature set to said first value is transmitted, and increasing a second counter when a data unit having said feature set to said second value is transmitted;
    c) at said receiving node, for each received data unit of said data flow, checking said feature of said received data unit, increasing a third counter when said feature is equal to said first value, and increasing a fourth counter when said feature is equal to said second value; and
    d) while said steps a), b) and c) are performed, at a management server cooperating with said communication network detecting values of said first counter, said second counter, said third counter and said fourth counter, and calculating a data loss value based on detected values of said first counter, said second counter, said third counter and said fourth counter.

2. The method according to claim 1, wherein said step a) comprises marking each data unit of said data flow by setting at least one bit of said data unit to one of a first value and a second value.

3. The method according to claim 1, wherein said step a) comprises marking each data unit of said data flow by setting at least two bits of said data unit to values for distinguishing said data units from further data units processed by said transmitting node and belonging to data flows other than said data flow.

4. The method according to claim 1, wherein said step a) comprises marking said data units for dividing said data flow in blocks all having a same number of data units.

5. The method according to claim 1, wherein said step a) comprises marking said data units for dividing said data flow in blocks all having a time duration equal to a block period.

6. The method according to claim 1, wherein said step d) comprises periodically detecting values of said first counter, said second counter, said third counter and said fourth counter every detection period and wherein said step a) comprises setting a block period equal to at least twice the value of said detection period, so that during said step d), said values of said first counter, said second counter, said third counter and said fourth counter are detected at least twice.

7. The method according to claim 6, wherein said step d) comprises, at each detection period:
    d1) if the value of said first counter detected at said detection period is equal to the value of said first counter detected at a previous detection period and is different from the value of said first counter detected at a further previous detection period, and the value of said second counter detected at said detection period is different from the value of said second counter detected at the previous detection period:
        calculating said data loss value as a difference between the value of said first counter detected at said detection period and the value of said third counter detected at said detection period; and d2) if the value of said first counter detected at said detection period is different from the value of said first counter detected at a previous detection period and the value of said second counter detected at said detection period is equal to the value of said second counter detected at a previous detection period and is different from the value of said second counter detected at a further previous detection period:

calculating said data loss value as a difference between the value of said second counter detected at said detection period and the value of said fourth counter detected at said detection period.

8. The method according to claim 1, wherein said data flow is a point-to-multipoint transmission among a transmitting node and a plurality of receiving nodes, and wherein said step d) is performed detecting once the value of said first counter and said second counter at said transmitting node.

9. The method according to claim 1, wherein said data unit is a data packet and said communication network is a packet-switched communication network, the method being for measuring packet loss of a packet flow transmitted through said packet-switched communication network.

10. A communication network comprising a transmitting node, a receiving node and a management server for cooperating with said communication network, wherein said transmitting node is configured to:
   a) mark each data unit of a data flow by setting a feature of a data unit to one of a first value or a second value for dividing said data flow in blocks so that data units belonging to a same block have said feature with a same value, and data units belonging to contiguous blocks have said feature with different values;
   b) transmit said data flow to a receiving node, said transmitting comprising increasing a first counter when a data unit having said feature set to said first value is transmitted, and increasing a second counter when a data unit having said feature set to said second value is transmitted; and
wherein said receiving node is configured to:
   c) for each received data unit of said data flow, check said feature of said received data unit, increase a third counter when said feature is equal to said first value, and increase a fourth counter when said feature is equal to said second value; and
wherein said management server is configured to:
   d) while said transmitting node performs said steps a) and b) and said receiving node performs said step c), detect values of said first counter, said second counter, said third counter and said fourth counter, and calculate a data loss value based on detected values of said first counter, said second counter, said third counter and said fourth counter.

11. The communication network according to claim 10, wherein said transmitting node is configured to mark said data units for dividing said data flow in blocks all having a same number of data units.

12. The communication network according to claim 10, wherein said transmitting node is configured to mark said data units for dividing said data flow in blocks all having a duration equal to a block period.

13. The communication network according to claim 10, wherein said receiving node is configured to periodically detect values of said first counter, said second counter, said third counter and said fourth counter every detection period and wherein said receiving node is configured to, at each detection period:
   d1) if the value of said first counter detected at said detection period is equal to the value of said first counter detected at a previous detection period and is different from the value of said first counter detected at a further previous detection period, and the value of said second counter detected at said detection period is different from the value of said second counter detected at the previous detection period:

calculate said data loss value as a difference between the value of said first counter detected at said detection period and the value of said third counter detected at said detection period; and d2) if the value of said first counter detected at said detection period is different from the value of said first counter detected at a previous detection period and the value of said second counter detected at said detection period is equal to the value of said second counter detected at a previous detection period and is different from the value of said second counter detected at a further previous detection period:

calculate said data loss value as a difference between the value of said second counter detected at said detection period and the value of said fourth counter detected at said detection period.

14. The communication network according to claim 10, wherein said data flow is a point-to-multipoint transmission among a transmitting node and a plurality of receiving nodes, and wherein said step d) is performed detecting once the value of said first counter and said second counter at said transmitting node.

15. The communication network according to claim 10, wherein the communication network is a packet-switched communication network and wherein said data unit is a data packet.

* * * * *